United States Patent [19]
Steigerwald

US005773966A

[11] Patent Number: 5,773,966
[45] Date of Patent: Jun. 30, 1998

[54] DUAL-MODE, HIGH-EFFICIENCY DC-DC CONVERTER USEFUL FOR PORTABLE BATTERY-OPERATED EQUIPMENT

[75] Inventor: Robert Louis Steigerwald, Burnt Hills, N.Y.

[73] Assignee: General Electric Company, Schenectady, N.Y.

[21] Appl. No.: 554,174

[22] Filed: Nov. 6, 1995

[51] Int. Cl.⁶ ....................................................... G06F 1/56
[52] U.S. Cl. ............................................................ 323/284
[58] Field of Search ..................................... 323/282, 284, 323/285, 223, 224; 363/23, 25, 26

[56] References Cited

U.S. PATENT DOCUMENTS

| | | | |
|---|---|---|---|
| 3,769,568 | 10/1973 | Hamilton et al. | 363/25 |
| 5,546,294 | 8/1996 | Schutten et al. | 363/17 |
| 5,548,206 | 8/1996 | Soo | 323/284 |

*Primary Examiner*—Matthew V. Nguyen
*Attorney, Agent, or Firm*—Jill M. Breedlove; Marvin Snyder

[57] ABSTRACT

A dual-mode dc—dc converter is configured for operation at high efficiencies over a wide load range. At light loads and during equipment sleep mode, a dc—dc converter is operated in a linear regulation mode; at heavy loads, the dc—dc converter is operated in a switching mode. In this way, efficiency is maximized over a wide load range, and for portable battery-operated equipment, for example, battery operating time is extended. The linear regulation mode avoids any switching losses which can far exceed the low output power at light loads, including equipment sleep mode. To further extend battery life, synchronous rectification is used during the switching mode, and low drop-out regulation is used during the linear regulation mode over the entire battery voltage range and load range. During the switching mode, the converter is synchronized to the system clock in order to minimize interference. Advantageously, a converter according to the present invention is useful for low-noise portable equipment such as, for example, cellular phones.

12 Claims, 3 Drawing Sheets

DUAL-MODE, HIGH-EFFICIENCY DC-DC CONVERTER USEFUL FOR PORTABLE BATTERY-OPERATED EQUIPMENT

The United States Government has certain rights in this invention pursuant to Contract No. F29601-94-C-0160 with DARPA.

FIELD OF THE INVENTION

The present invention relates generally to power converters and, more particularly, to a dc—dc converter which is operated in dual modes in order to maximize efficiency over a wide load range, which converter may be useful for extending battery operating time in portable equipment, for example.

BACKGROUND OF THE INVENTION

Linear regulators are typically used for power conversion in portable equipment, such as cellular phones. Unfortunately, linear regulators operate at low efficiencies. Switching regulators have been proposed as an alternative to linear regulators in order to maximize efficiency, but the efficiency of switching regulators is low at light loads. Two methods have been proposed to increase efficiency of a switching regulator at light loads. The first is to use variable frequency operation at light loads. The second is to use a burst mode wherein the converter is switched on and off in a "hiccup" style. Although both of these methods are effective to increase efficiency at light loads, they are not acceptable for noise sensitive applications, such as cellular phones, due to the frequency-varying spectrums generated by such methods and the inability of such systems to synchronize the converter to a system clock. And, synchronization to a system clock is mandatory in noise sensitive applications in order to maximize filter effectiveness and to eliminate the random nature of the noise.

Accordingly, it is desirable to maximize efficiency of a converter over a wide load range, thereby extending the useful life of a battery in portable equipment applications, for example. Further, it is desirable to provide such a highly efficient converter with a minimum number of power train components.

SUMMARY OF THE INVENTION

A dual-mode dc—dc converter is configured for operation at high efficiencies over a wide load range. At light loads and during equipment sleep mode, the dc—dc converter is operated in a linear regulation mode; at heavy loads, the dc—dc converter is operated in a switching mode. In this way, efficiency is maximized over a wide load range, and for portable battery-operated equipment, for example, battery operating time is extended. The linear regulation mode avoids any switching losses which can far exceed the low output power at light loads, including equipment sleep mode. To further extend battery life, synchronous rectification is used during the switching mode, and low drop-out regulation is used during the linear regulation mode over the entire battery voltage range and load range. During the switching mode, the converter is synchronized to the system clock in order to minimize interference. Advantageously, a converter according to the present invention is useful for low-noise portable equipment such as, for example, cellular phones.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

The present invention solves the problem of maximizing battery life in portable equipment, such as, for example, cellular phones. Some equipment spends a considerable amount of time at light loads, including equipment sleep mode wherein the equipment is turned on, but is not operating. Therefore, it is important that the power converter for such equipment be as efficient as possible when operating under light load conditions.

Figure 1:
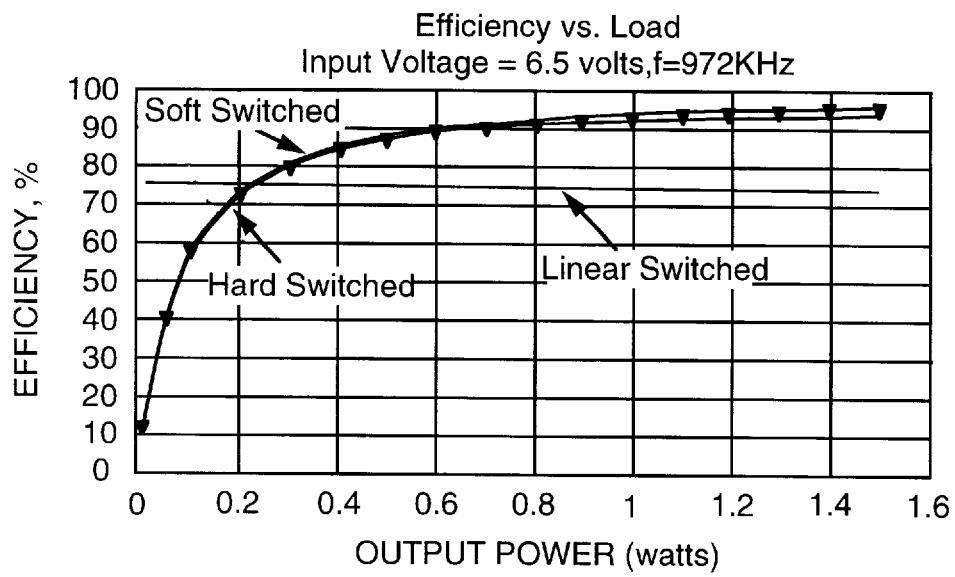
FIG. 1 graphically illustrates efficiency of a 5 V switching regulator as a function of output power for a particular input battery voltage (6.5 V)
Figure 2:
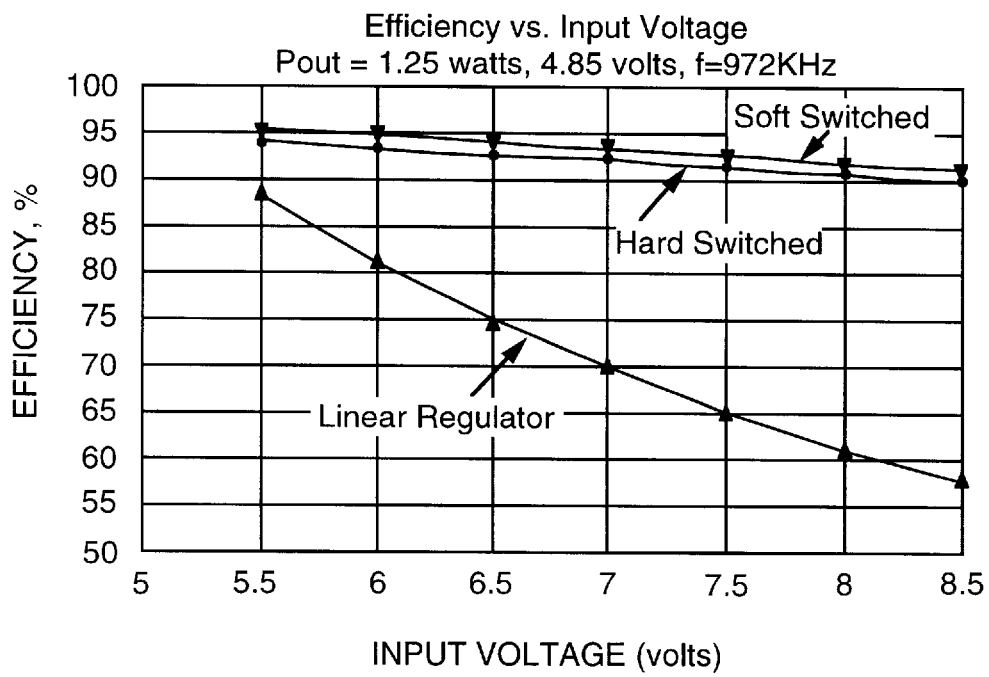
FIG. 2 graphically illustrates the efficiency of a switching regulator as a function of input voltage for a heavy load (1.25 Watts)
Figure 3:
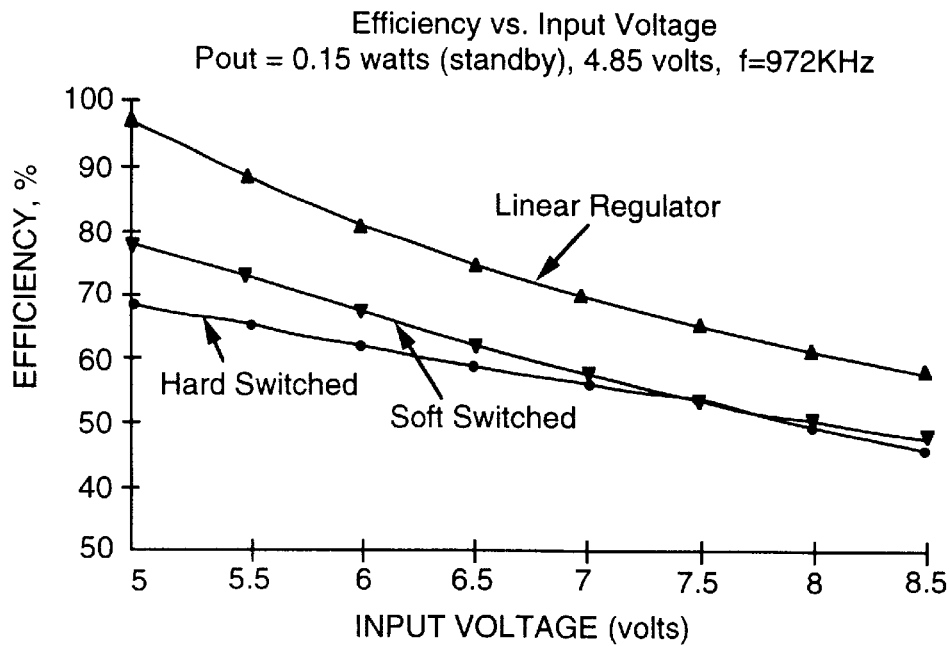
FIG. 3 graphically illustrates the efficiency of a switching regulator as a function of input voltage for a light load (0.15 Watts)

FIG. 1 shows the efficiency of 5 V switching regulators, hard-switched and soft-switched, as a function of output power for a particular input battery voltage (6.5 Vdc). The efficiency of a linear regulator, given approximately by Voutput/Vinput for a 6.5 V input is also shown. The graph of FIG. 1 shows that the efficiency of the switching regulator is about 13 percentage points higher at heavy loads, but for operation below 0.27 Watts, the linear regulator is more efficient. At very light loads, including equipment sleep mode, the linear regulator is considerably more efficient than the switching regulator. FIGS. 2 and 3 show the efficiency of the same switching regulators as a function of input voltage for a heavy load (1.25 Watts) and a light load (0.15 Watts). It is apparent that while all of these converters loose efficiency as the input voltage increases, the switching regulators are far more efficient at heavy loads while the linear regulators are far more efficient at light loads.

Figure 4:
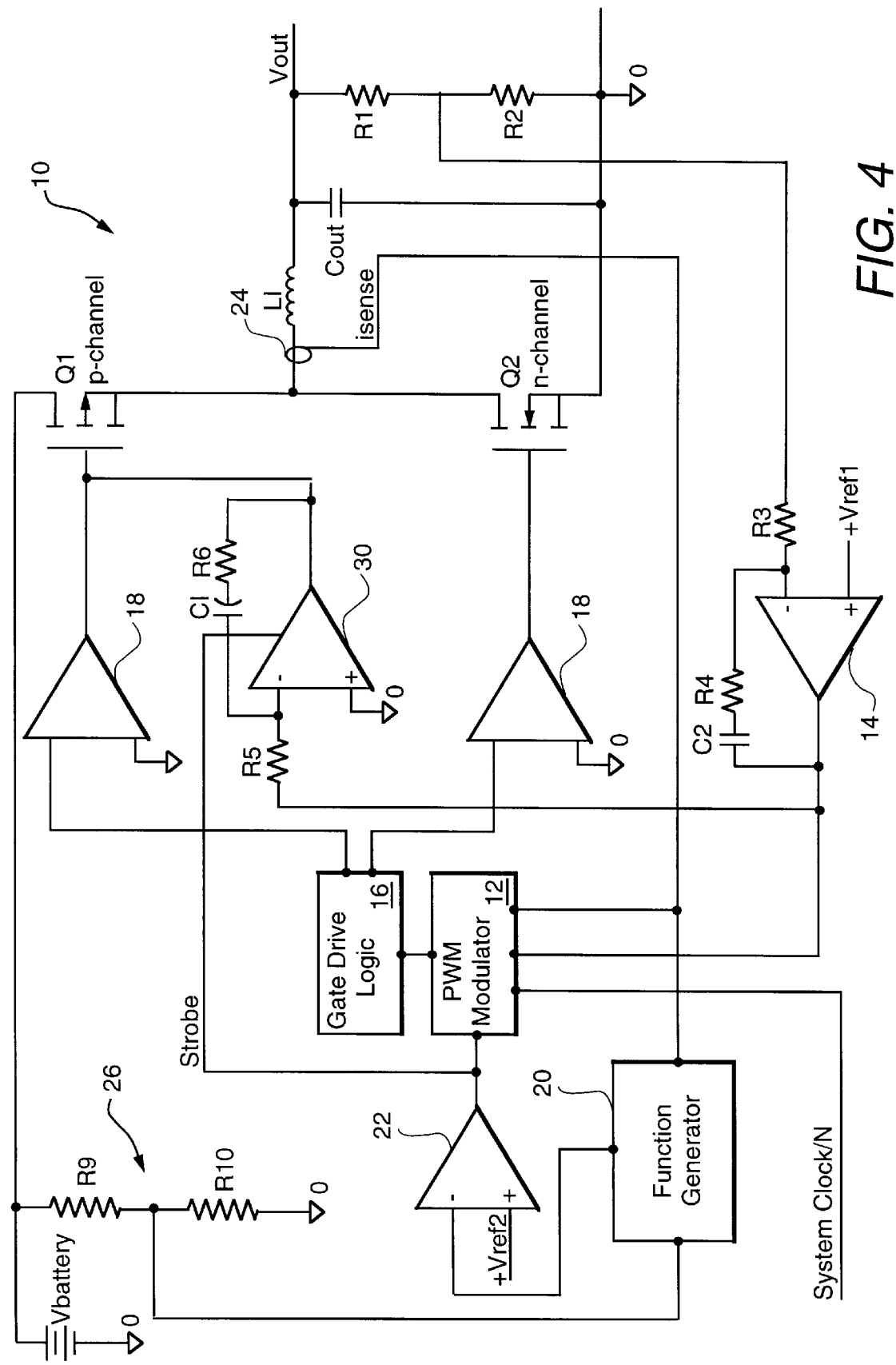
FIG. 4 schematically illustrates a dual-mode, high-efficiency converter according to the present invention.

FIG. 4 illustrates a high efficiency converter according to a preferred embodiment of the present invention which comprises a dc—dc buck converter 10, comprising an upper field effect transistor (FET) Q1 and a lower FET Q2 connected in a half-bridge configuration, a filter inductor L1, and an output filter capacitance Cout. The FET Q2 is preferably a synchronous rectifier which is defined as a device which operates with a low on-resistance and synchronously switches when its antiparallel diode conducts so that current goes through the FET channel rather than the diode.

The buck converter steps down the input battery voltage Vbattery to the output voltage Vout. For heavy loads, the FET's are controlled by a pulse width modulator 12 which is commanded by an error amplifier 14 that compares the output voltage Vout with a reference voltage +Vref1. The pulse width modulator 12 interfaces with a gate drive logic circuit 16 which, in turn, controls gate drivers 18 which drive the power FET's Q1 and Q2 in a pulse width modulation (PWM) mode. The gate drive logic 16 performs a well-known "break before make" function to provide a dead time between switching one FET off and the other FET on in order to insure that the FET's Q1 and Q2 are never on at the same time, thereby minimizing switching losses. The PWM modulator 12 is synchronized with a system clock (which is shown as being generated by dividing by a frequency pre-scaler N in conventional manner) to reduce switching interference to other electronics external to this converter.

Figure 5A:
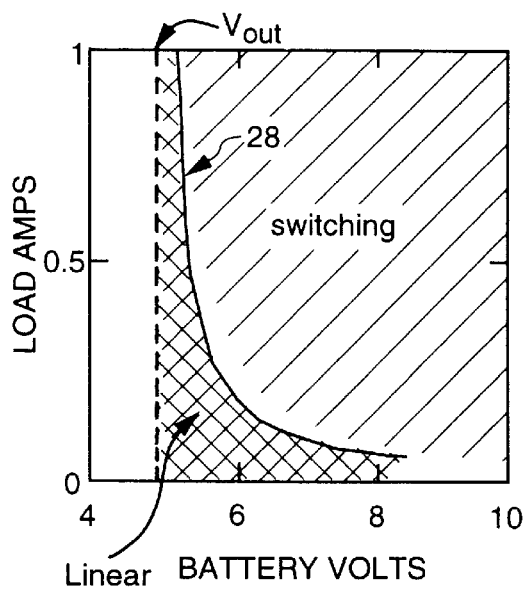
FIG. 5a graphically illustrates the approximate plane which defines the optimum regions for switching and linear operation according to the present invention.
Figure 5B:
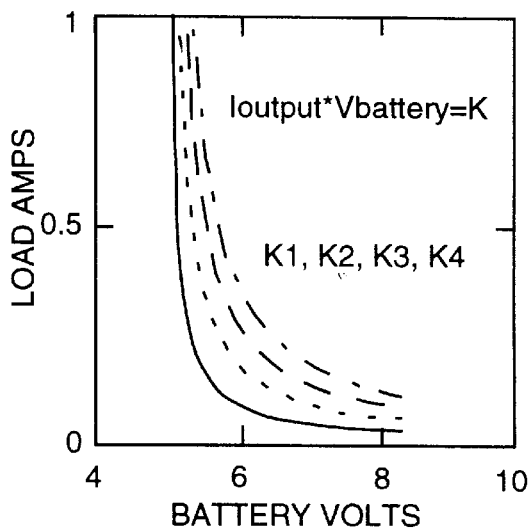
FIG. 5b graphically illustrates the curve of FIG. 5a generated as an approximately hyperbolic curve.

In operation, the gate drivers 18 are strobed; that is, they can be enabled or disabled by a strobe signal from a function generator 20 which determines whether the converter 10 will be operated in the switching mode or the linear regulating mode. The strobe signal is provided as the output signal STROBE of a comparator 22 which compares the output signal from the function generator 20 with a reference signal +Vref2. As shown in FIG. 4, the inputs to the function generator 20 are load current isense, as provided by a current sensor 24, and battery voltage Vbattery, as provided by a voltage sensor 26. In one embodiment, the converter 10 is switched between the two modes of operation based only on the load current isense. From FIGS. 1–3, however, it is apparent that the optimum mode of operation, i.e., switching or linear, is a function of both input voltage and output power for a given output voltage (e.g., 5 V). Therefore, it is generally preferable to factor in the effect of input battery voltage on the switching function. FIG. 5a shows the approximate plane which defines the optimum regions for switching and linear operation by virtue of a mode switching line 28. FIG. 5b shows that the mode switching line may be approximately and simply generated as a hyperbolic curve, the shape of which is adjusted by a constant K. By varying the constant K, the shape of the mode switching line can be selected to approximate the optimum case as illustrated in FIG. 5b. Thus, a simple method of generating the mode switching line 28 is to divide the constant K by the input voltage Vbattery: For values of load current less than this quantity, the converter is operated in the linear regulation mode; otherwise, the converter is operated in the switching regulation mode.

For operation in the linear regulating mode, the strobe signal disables the gate drivers 18 and enables an inverting amplifier/compensator 30. In this way, a linear feedback loop is obtained with its own set of feedback compensators determined by the product of the gains of the error amplifier 14 and the inverting amplifier/compensator 30. When the gate drivers 18 are disabled by the strobe signal, they assume a high impedance output so that they do not load down the inverting amplifier/compensator 30. Likewise, in the switching mode, when the gate drivers 18 are enabled, the inverting amplifier/compensator 30 is strobed off (i.e., assumes a high impedance output) so that it does not load down the gate drivers 18.

As shown in FIG. 4, the FET Q1 is preferably a p-channel device so that low drop-out operation is achieved with a gate drive voltage below that of the positive battery voltage. That is, output voltage regulation is maintained even with a very low battery voltage, thus eliminating the need for an additional power supply voltage that would be needed if an n-channel device were used.

Advantageously, the dual-mode converter according to the present invention assures mode switching for high efficiency over a wide load range, thereby extending the useful life of the battery. In addition, as long as the switching frequency is synchronized to the system master clock during the switching mode, the circuit is useful for use in low noise applications. Furthermore, the entire control can be implemented in a single integrated circuit chip to provide a simple, efficient converter with a low parts count.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A dual-mode dc—dc converter system, comprising:

a dc—dc converter for converting an input dc voltage to an output dc voltage, said dc—dc converter comprising at least one power switching device;

gate driver circuitry for providing gating signals for driving said at least one power switching device;

a strobe signal generator responsive to load current outputted by said dc—dc converter for providing a strobe signal to said gate driver circuitry for commanding operation of said converter in a switching regulation mode or a linear regulation mode, said strobe signal commanding operation in a switching regulation mode for values of said load current above a threshold and in a linear regulation mode for values of said load current below said threshold.

2. The converter system of claim 1 wherein said strobe signal generator is further responsive to said input dc voltage such that said strobe signal commands operation in said switching regulation mode and said linear regulation mode in order to maximize efficiency based on said input dc voltage and said load current.

3. The converter system of claim 2 wherein said strobe signal generator comprises a function generator having said input dc voltage and said load current as inputs thereto.

4. The converter system of claim 1 wherein said dc—dc converter comprises a buck converter for stepping down said input dc voltage to provide said output dc voltage.

5. The converter system of claim 4 wherein said dc—dc converter comprises a bridge converter with at least two switching devices coupled together in a half-bridge configuration.

6. The converter system of claim 5, further comprising a pulse width modulator for controlling said switching devices in a PWM mode at heavy loads.

7. The converter system of claim 5 wherein said converter comprises a main switching device and a synchronizing switching device coupled together in a half-bridge configuration.

8. The converter system of claim 7 wherein said main switching device and said synchronizing switching device are controlled to have a dead time between switching thereof such that only one of said devices is on at a time.

9. The converter system of claim 7 wherein said main switching device comprises a p-channel FET having a gate voltage of a lower value than the positive value of said input dc voltage, said synchronizing switching device comprising an n-channel FET.

10. The converter system of claim 2 wherein said function generator is synchronized to said system clock.

11. The converter system of claim 1, further comprising a linear feedback loop for providing linear feedback at light loads.

12. The converter system of claim 11 wherein said linear feedback loop comprises an inverting amplifier/compensator circuit.

* * * * *